United States Patent Office 3,266,884
Patented August 16, 1966

3,266,884
DINITROPHENYL COMPOUND HAVING HERBICIDAL PROPERTIES AND METHOD OF USING THE SAME
Krijn van den Boogaart, Vlaardingen, Netherlands, assignor to Fabriek van Chemische Producten Vondelingenplaat N.V., Rotterdam, Netherlands, a Dutch corporation
No Drawing. Filed Jan. 3, 1963, Ser. No. 249,111
Claims priority, application Great Britain, Jan. 8, 1962, 707/62
2 Claims. (Cl. 71—2.6)

The invention provides new compounds having herbicidal properties, herbicidal compositions containing these compounds and a process for preparing the new compounds.

It has been found that compounds having the general formula

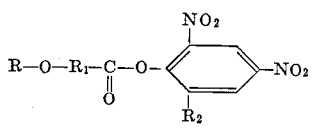

wherein R represents an aryl radical, e.g. a phenyl or a naphthyl radical, which may be substituted by one or more halogen atoms and/or by an alkyl radical having from 1 to 4 carbon atoms, $R_1$ represents an alkylene radical having from 1 to 4 carbon atoms and $R_2$ represents an alkyl radical having from 1 to 5 carbon atoms or a cycloalkyl radical, have an excellent herbicidal activity with a combined growth regulating and contact-action.

Numerous esters of the class

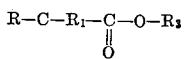

wherein R and $R_1$ have the above mentioned meaning and $R_3$ represents e.g. a methyl, isopropyl, octyl, butoxyethyl, tetrahydrofuryl or aryloxyethylene radical, are known.

Moreover a weed-control agent in flax consisting of a mixture of 2-methyl 4-chlorophenoxy acetic acid and 2,4-dinitro 6-sec. butylphenol and/or salts thereof has been described.

The compounds of the application, however, have not been known till now.

The compounds according to the invention can be prepared in a way known as such for analogous compounds, e.g. by condensation of an aryloxyalkanoic acid halogenide having the formula R—O—$R_1$—COHal wherein Hal represents a chlorine, bromine or iodine atom, especially a chlorine atom, with a 2,4-dinitro 6-$R_2$-phenol. R, $R_1$ and $R_2$ have herein the above meaning.

Herbicidal compositions can be prepared by mixing one or more of the esters having the above mentioned general formula with a solid or liquid carrier and, if desired, with a dispersing agent, emulsifying agent, wetting agent or another usual ingredient of herbicidal compositions.

The percentage of active substance in strewing powders is in general 10–50% by weight. The rest consists of attapulgite, talc, diatomaceous earth or marl.

Spraying-powders contain 50–90% by weight of the solid active substance and for the rest a dispersing agent, e.g. lignine sulphonate, metoxycellulose or carboxymethylcellulose, a wetting agent, e.g. esters of polyethylene glycol ether or alkylarylsulphonates, and a carrier, e.g. attaclay, inorganic salts or chalk.

Example I

To a solution of 594 grams (3.0 mol) of 2,4-dinitro orthocresol in 4 liters of toluene 238 grams of pyridine are added. To the resulting mixture 684 grams (3.0 mol) of 2-methyl 4-chlorophenoxy-acetic acid chloride are added. While stirring the mixture is heated to a temperature of 55–60° C. and 30 mil. of pyridine are added. Subsequently water is added while stirring and the resulting insoluble part is filtered. The liquid layer obtained is extracted with n-HCl and a 10% sodium carbonate solution and dried. About 60% of the toluene is distilled off and the remaining product is cooled. By cooling part of the desired ester crystallizes. It is filtered and dried under subatmospheric pressure at a temperature of 40°–45° C. The filtrate which consists of a saturated solution of the ester in toluene, is evaporated and dried under subatmospheric pressure at a temperatre of 40°–45° C. as well. Altogether 1022 grams of the product are obtained. Yield 89.5%.

Example II

Using the method of Example I an ester is prepared starting from 2,4-dinitro 6-sec. butylphenol and 2-methyl 4-chlorophenoxyacetic acid chloride. When using 3.0 mol of both starting products 1204 grams are obtained. Yield 95%.

Example III

For testing the activity of the compounds according to the invention the products of Examples I and II as well as 2,4-dinitro-orthocresol (DNOC), 2,4-dinitro 6-sec. butylphenol (DNPB) and 2-methyl 4-chlorophenoxy acetic acid (MCPA) were sprayed on tomato-plants having a height of about 7 cm. in concentrations of 1, ½, ¼ to ½048% of active substance. After 1, 4 and 23 days the phytocidal activity was judged.

The results are indicated in Table I, in which XXX= total killing (by burning); XX=heavy damage; X=slight damage; 0=no damage.

The underlinings indicate a clearly perceptible growth regulating activity.

TABLE I

| Product | Days | Concentrations | | | | | | | | | | | |
|---|---|---|---|---|---|---|---|---|---|---|---|---|---|
| | | 1 | ½ | ¼ | ⅛ | 1/16 | 1/32 | 1/64 | 1/128 | 1/256 | 1/512 | 1/1024 | 1/2048 |
| DNOC | 1 | | | | XXX | XXX | X | 0 | 0 | 0 | 0 | 0 | 0 |
| | 4 | | | | XXX | XXX | XX | XX | X | X | 0 | 0 | 0 |
| | 23 | | | | XXX | XXX | XXX | XXX | X | 0 | 0 | 0 | 0 |
| DNBP | 1 | XXX | XXX | XXX | XXX | XXX | XXX | XX | X | 0 | 0 | 0 | 0 |
| | 4 | XXX | XXX | XXX | XXX | XXX | XXX | XXX | XX | X | X | 0 | 0 |
| | 23 | XXX | XXX | XXX | XXX | XXX | XXX | XXX | XX | X | 0 | 0 | 0 |
| MCPA | 1 | 0 | 0 | 0 | 0 | 0 | 0 | 0 | 0 | 0 | 0 | 0 | 0 |
| | 4 | 0 | 0 | 0 | 0 | 0 | 0 | 0 | 0 | 0 | 0 | 0 | 0 |
| | 23 | XXX | XXX | XXX | XXX | XX | XX | 0 | 0 | 0 | 0 | 0 | 0 |
| Product of Example 1 | 1 | XXX | XXX | XXX | XX | X | 0 | 0 | 0 | 0 | 0 | 0 | 0 |
| | 4 | XXX | XXX | XXX | XXX | XX | X | 0 | 0 | 0 | 0 | 0 | 0 |
| | 23 | XXX | XXX | XXX | XXX | XXX | XXX | 0 | 0 | 0 | 0 | 0 | 0 |
| Product of Example 2 | 1 | XXX | XXX | XXX | XXX | XXX | XXX | XXX | XX | X | 0 | 0 | 0 |
| | 4 | XXX | XXX | XXX | XXX | XXX | XXX | XXX | XXX | XX | X | 0 | 0 |
| | 23 | XXX | XXX | XXX | XXX | XXX | XXX | XXX | XXX | XXX | X | X | X |

It appears from Table I that the compounds of the Examples 1 and 2 both show an excellent all-around herbicidal action. The compound of Example I, which can be considered as consisting of a DNOC part and a MCPA part, shows about the same contact action, based on the amount of the DNOC-part of the molecule, as a corresponding amount of DNOC itself, whereas the growth regulating action, based on the amount of the MCPA-part of the molecule, is the same as the growth regulating action of a corresponding amount of MCPA. Thus both properties are surprisingly combined in one single compound. When comparing the compound of Example II with the compounds DNPB and MCPA it appears that the compound of the invention shows a still more favourable activity than each of the known compounds.

Example IV

A field test on weeds in rye was carried out with the product of Example II using a so-called manual logarithmic spraying apparatus. The test results are given in Table II. Therein a rating from 0 to 10 inclusive is used for the rye and the weeds. In the column of the rye 0 indicates that all rye has been killed and 10 that no rye has been damaged. On the contrary in the column of the weeds 0 indicates that no weeds have been damaged and 10 indicates that all weeds have been killed.

TABLE II

| Percent of active substance (product of Example 2) | Rating | |
|---|---|---|
| | Rye | Weeds |
| 1.0–0.80 | 5 | 10 |
| 0.80–0.62 | 4 | 9.5 |
| 0.62–0.47 | 6 | 9.5 |
| 0.47–0.35 | 7 | 9.5 |
| 0.35–0.25 | 8 | 9 |
| 0.25–0.176 | 9 | 7.5 |
| 0.176–0.120 | 10 | 5 |
| 0.120–0.083 | 10 | 3 |
| 0.083–0.058 | 10 | 1 |

Per hectare 1769.7 liters of liquid have been sprayed.

The highest efficiency has been obtained with a concentration of about 0.25% (both columns show a high rating). This means an amount of 4.4 kg. of active substance per hectare.

I claim:
1. The compound of the formula

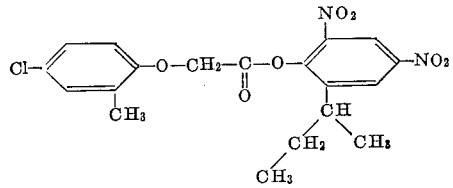

2. The method of destroying growing plants which comprises applying to said plants an herbicidal amount of composition containing as the essential active ingredient the compound of the formula

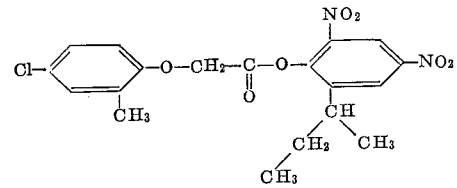

References Cited by the Examiner

UNITED STATES PATENTS 3,123,522   3/1964   Scherer et al. -------- 260—475

OTHER REFERENCES

Bates et al., Ann. Appl. Biol., 50, pp. 21–32 (1962).
Matolsey et al., Research Institute Plant Protection, 5, pp. 95–106 (1956).
Bouwman, Chem. Weekblad, 55, pp. 540–1 (1959).

LORRAINE A. WEINBERGER, *Primary Examiner.*

LEON ZITVER, *Examiner.*

M. S. JAROSZ, S. B. WILLIAMS, *Assistant Examiners.*